(12) United States Patent
Okamoto et al.

(10) Patent No.: US 6,779,194 B2
(45) Date of Patent: Aug. 17, 2004

(54) DISC CARTRIDGE FOR ONE-SIDED DISC-SHAPED RECORDABLE MEDIUM

(75) Inventors: Tomomi Okamoto, Fujisawa (JP); Kyuichiro Nagai, Fujisawa (JP)

(73) Assignee: Hitachi, Ltd. (JP)

( * ) Notice: Subject to any disclaimer, the term of this patent is extended or adjusted under 35 U.S.C. 154(b) by 198 days.

(21) Appl. No.: 10/113,314

(22) Filed: Mar. 28, 2002

(65) Prior Publication Data

US 2003/0058783 A1 Mar. 27, 2003

(30) Foreign Application Priority Data

Sep. 21, 2001 (JP) .................................... 2001-288011

(51) Int. Cl.⁷ .............................................. G11B 23/03
(52) U.S. Cl. ......................................................... 720/725
(58) Field of Search ...................... 369/291, 17, 292; 360/132, 133, 134, 135; 206/310; 428/65.3

(56) References Cited

U.S. PATENT DOCUMENTS

| 4,847,826 A | * | 7/1989 | Sakaguchi et al. | .......... 369/291 |
| 5,206,844 A | * | 4/1993 | Ishii | ........................... 369/291 |
| 5,529,182 A | * | 6/1996 | Anderson et al. | ............ 206/310 |
| 6,078,562 A | * | 6/2000 | Kikuchi | ..................... 369/291 |

FOREIGN PATENT DOCUMENTS

| JP | 08-161848 | 6/1996 |
| JP | 2001-189068 | 12/1999 |

* cited by examiner

Primary Examiner—George J. Letscher
Assistant Examiner—Christopher R Magee
(74) Attorney, Agent, or Firm—Townsend and Townsend and Crew LLP

(57) ABSTRACT

A disc cartridge having a single case member which covers most of the base surface of the disc cartridge and is disposed on the recording side of a recording medium is described. An access window for a recording/playback device to access the recording medium is opened and closed by a shutter.

3 Claims, 3 Drawing Sheets

DISC CARTRIDGE FOR ONE-SIDED DISC-SHAPED RECORDABLE MEDIUM

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

1. Field of the Invention

This invention relates to a disc cartridge holding a disc-shaped recording medium, and particularly to a disc cartridge from which the recording medium can be removed.

2. Description of the Related Art

Examples of disc-shaped recording media include optical discs and the like. Such discs are often housed inside a disc cartridge to prevent grease and dirt on hands from getting onto the recording part of the disc and to make handling of the disc easier.

Disc cartridges in related art generally have had the kind of form shown in Japanese Unexamined Patent Publication No. 161848/1996, in which a disc-shaped medium is rotatably housed inside a case made up of an upper case half and a lower case half, the case having an access opening and a shutter for opening and closing the access opening with a U-shaped cross section.

Thus, in related art disc cartridges, numerous parts in addition to the two shell halves are needed so that the disc is not exposed. Because the front of the disc cartridge case, which is the upper half, and the rear of the disc cartridge case, which is the lower half, are generally asymmetrical, the two case halves have had different shapes and have each had to be molded separately. For these reasons there has been a limit to how far the cost of the disc cartridge can be reduced, and this has been a factor preventing the cost of a disc cartridge containing a recording medium from being reduced.

As a result of reductions in data writing defects due to adaptive recording control responsive to the disc surface, reductions in data misrecognition achieved through repeat playback of the same location, and improved error correction processing, the reliability of recording and playback technologies has been markedly improving. This improvement in recording and playback technologies makes possible improving recording and playback performance if normal storage and usage to prevent the adhesion of dust to the surface of the disc is carried out.

However, even with improved recording and playback technologies, it is still difficult to prevent deterioration of recording and playback performance resulting from grease from hands, etc., getting onto the recorded part of a disc. For a disc which is not used in a disc cartridge, dirt or grease adhering to a disc is mainly caused by user handling who accidentally touch the recording part. On the other hand, when a disc cartridge is used, there is no touching of the disc, and the adhesion of dirt can be largely prevented.

BRIEF SUMMARY OF THE INVENTION

This invention reduces the number of parts in a disc cartridge and thereby reduces its cost while maintaining the required reliability and freedom of use by placing importance only on the prevention of dirtying of the disc by the user. To achieve this and other objects, the invention provides a disc cartridge having a case member with a base surface area larger than that of the disc; an access window provided in the case member for a recording/playback device to access the disc; and a shutter for opening and closing the access window. The disc has a recording portion on only one side thereof, and the disc cartridge has only one case member.

The recording part on the recording side of the disc is substantially shielded from external harm by the case member and the shutter, and the non-recording side of the disc is substantially exteriorly exposed by the disc cartridge. Preferably, the case is an integral unit molded in resin, and the case member and the shutter have flanges to prevent the disc from falling out of the disc cartridge.

The projection of a flange provided on the shutter onto the same plane as the plane of the disc overlaps the disc when the shutter has closed the access window, and does not overlap the disc when the shutter has opened the access window.

This construction enables a lower-cost disc cartridge with fewer parts than prior art disc cartridges, but with comparable or better cleanliness.

DETAILED DESCRIPTION OF THE INVENTION

A preferred embodiment of the invention will now be described with reference to FIG. 1A through FIG. 3.

Figure 1:
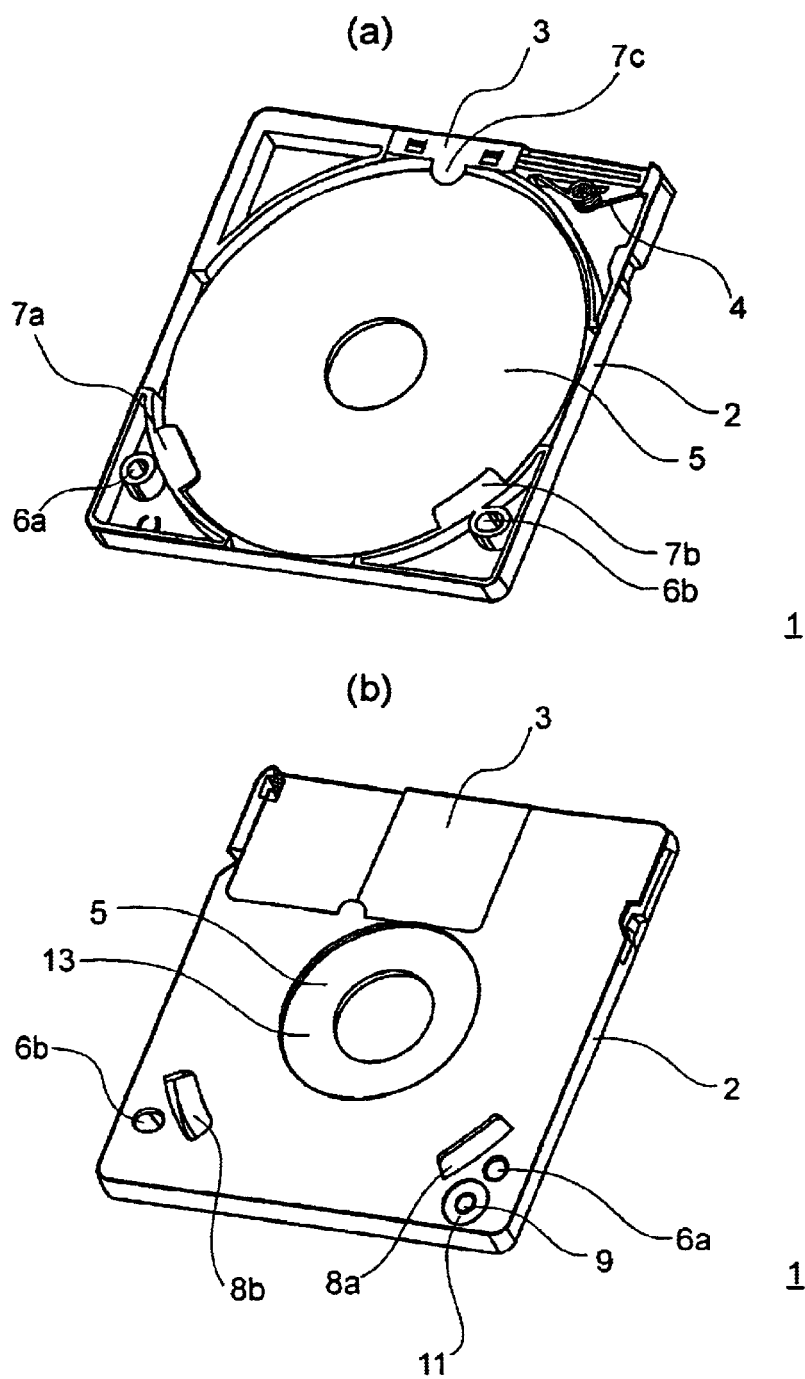
FIGS. 1A and 1B are perspective views of a preferred embodiment of a disc cartridge according to the invention.
Figure 2:
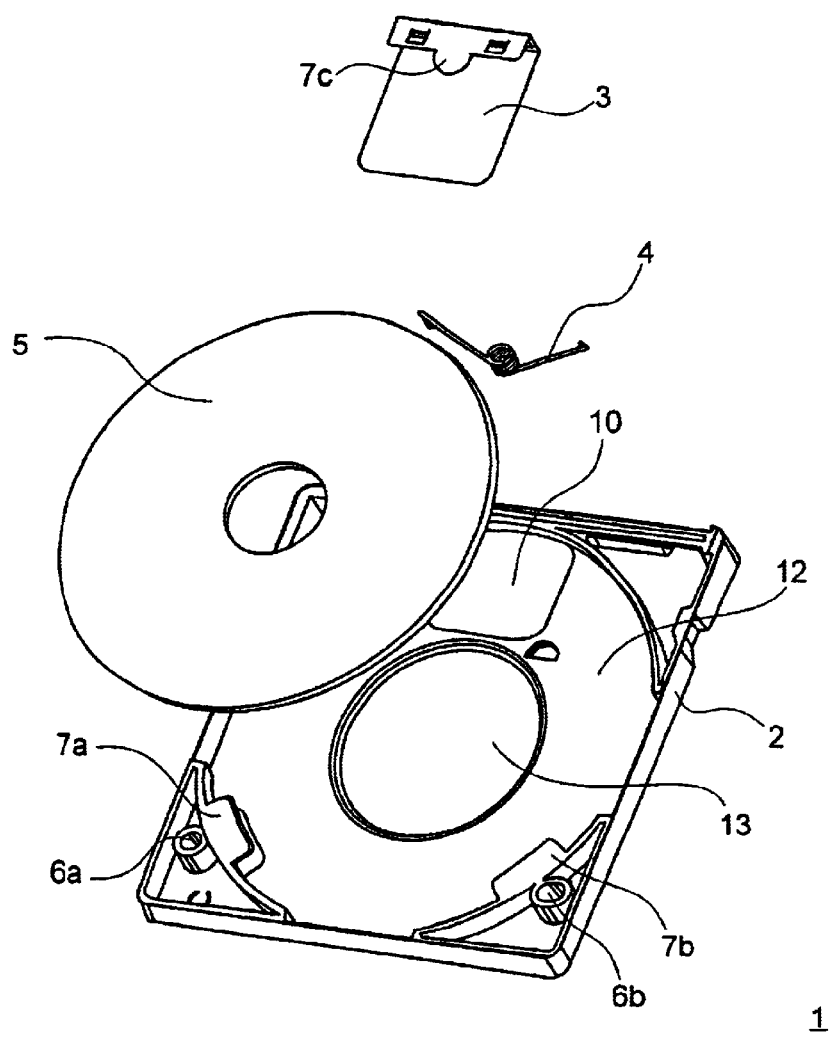
FIG. 2 is an exploded view of the same disc cartridge.

FIGS. 1A and 1B are perspective views of a preferred embodiment of a disc cartridge according to the invention, with FIG. 1A showing the front side of the disc cartridge and FIG. 1B showing the rear side. FIG. 2 is an exploded view of the same disc cartridge. The disc cartridge 1 of this preferred embodiment is made up of a shell-like case member 2, a shutter 3 and a shutter spring 4. The case member 2 is of such a shape that it has a space 12 for a disc 5, an access window 10 for a recording/playback device to access the disc 5. Positioning holes 6a, 6b provide positioning the disc cartridge 1 in the recording/playback device, while flanges 7a, 7b for prevent the disc 5 from falling out of the disc cartridge 1. A clamping window 13 is provided for a spindle motor of the recording/playback device to clamp the disc 5, and a write protector 9 for distinguishing whether recording on the disc 5 is permitted or prohibited.

Shutter 3 is provided to open and close the access window 10, and is pushed by shutter spring 4 in the direction closing the access window. Access window 10 is closed at all times by the shutter 3 when disc cartridge 1 is not inside a recording/playback device. Shutter 3 also has a flange 7c to prevent disc 5 from falling out of disc cartridge 1.

The disc 5 used in this preferred embodiment is a disc having a recording portion on only one side thereof, and is disposed in disc cartridge 1 so that the side of the disc exposed in FIG. 1A is its non-recording side. In the disc cartridge 1 of this preferred embodiment, the non-recording side of disc 5 is almost entirely exteriorly exposed, as shown in FIG. 1A. The recording side, on the other hand, except at clamping window 13 and at cutaway parts 8a and 8b, is entirely shielded from ambient conditions by case member 2 and shutter 3. The part exposed at clamping window 13 is a clamping area which makes contact with the spindle motor, and is not part of the recording portion of the disc.

The recording portion of the disk is exposed at cutaway parts 8a and 8b, but these cutaway parts are of such a size that a user's fingers will not pass through them and cannot directly touch the disc. Because a disc cartridge 1 according to this preferred embodiment is not sealed, it does not completely prevent the ingress of dust; however, because the recording part of the recording side cannot be touched directly, users are prevented from touching and dirtying the recording part of disc 5 while handling disc cartridge 1. In this preferred embodiment only one unit of case member 2, which is the largest part, is needed, and thus it is possible to realize a reduction in the number of parts and a reduction in cost.

The disc has a recording portion on only one side thereof, and the disc cartridge has only one case member. The recording part on the recording side of the disc is substantially shielded from external elements by the case member and the shutter, and the non-recording side of the disc is substantially exteriorly exposed by the disc cartridge.

Because one objective is to achieve a cost reduction by reducing the number of parts required, the case member 2 of the disc cartridge 1 of this preferred embodiment is preferably integrally molded in resin. To form flanges 7a, 7b, cutaway parts 8a, 8b are needed. Because the recording part of disc 5 is exposed through these cutaway parts 8a, 8b, they are small to prevent a user's fingers from passing through them. In practice, these openings are no more than about 5 mm across.

Figure 3:
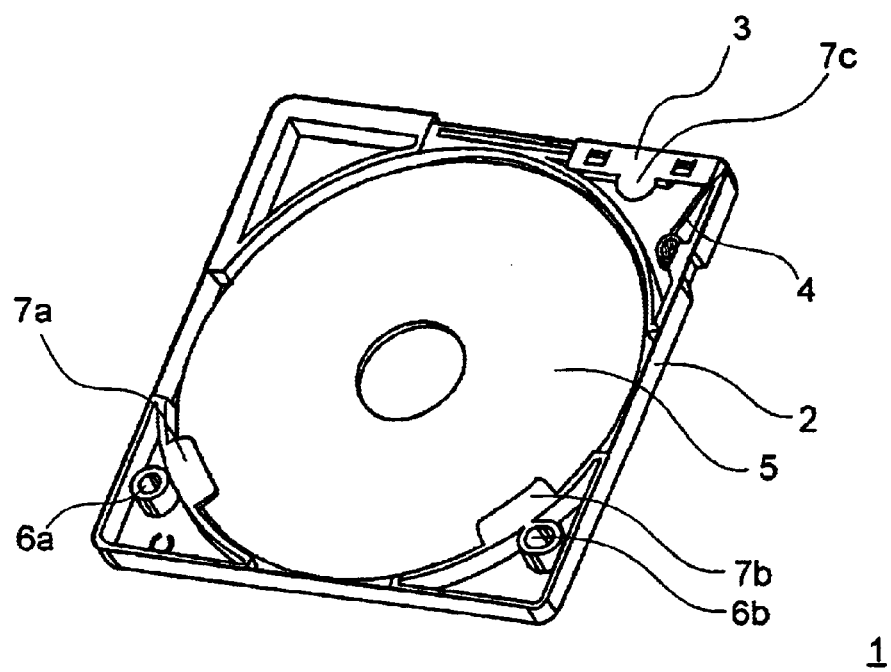
FIG. 3 is a perspective view of the same disc cartridge with the shutter open.

Disc cartridge 1 of this preferred embodiment also has flange 7c on the shutter 3, in addition to flanges 7a, 7b on the case member 2. The disc 5 is prevented from falling out by these flanges in three places. This will be now explained with reference to FIGS. 1A and 1B and FIG. 3. FIG. 1A shows a state wherein shutter 3 has closed access window 10, and FIG. 3 shows a state wherein shutter 3 has opened access window 10. When all of the flanges are provided on the case member, it is difficult to mount the disc in the case member because the flanges are obstructions. To avoid this, in this preferred embodiment, flange 7c is provided on movable shutter 3, so that disc 5 can be mounted to and removed from disc cartridge 1. When shutter 3 is moved as shown in FIG. 3, flange 7c moves to a position where its projection onto the plane of disc 5 is does not overlap disc 5, and flange 7c ceases to have a retaining effect on disc 5. When disc 5 is to be removed from disc cartridge 1, shutter 3 is moved to the position shown in FIG. 3. Normally when disc cartridge 1 is not inside a recording/playback device, and, as shown in FIG. 1A, shutter 3 is in the position in which it closes the access window, the projection of flange 7c onto the plane of disc 5 is in a position such that flange 7c prevents disc 5 from falling out.

When disc cartridge 1 is inside a recording/playback device, and shutter 3 is in the position shown in FIG. 3, flange 7c does not retain disc 5. Because inside the recording/playback device, the disc 5 and the disc cartridge 1 are held by mechanisms of the recording/playback device, no problem arises.

The write protector used in the disc cartridge of this preferred embodiment will now be described, with reference to FIG. 1B. In disc cartridges of related art, a switch provided as a separate part makes it possible for a user to switch between permitting and prohibiting recording.

In the present preferred embodiment, because an objective is to reduce the number of parts, write protector 9, shown in FIG. 1B, is integrally molded with case member 2. Write protector 9 is provided with notches around it so that it can be easily broken off by a user. In the area around these notches there is provided a tape-affixing area 11, recessed by a few hundred micrometers. When a user wants to prohibit recording of a disc cartridge 1, the user breaks off and removes write protector 9. The recording/playback device can discriminate between permission and prohibition of recording of the disc by detecting whether or not write protector 9 is present.

In this preferred embodiment, once the write protector 9 has been broken off, it is not possible to restore it. If a user wants to permit recording again, the user affixes tape or the like to tape-affixing area 11, covering the hole left by write protector 9. When disc cartridge 1 is being inserted into a recording/playback device, because there is a possibility of the lower side of the case member 2 sliding over the inside of the recording/playback device, if the tape is protruding it may peel off. In this preferred embodiment tape-affixing area 11 is recessed by several hundred $\mu$m so that as long as a tape of a thickness less than the recess depth is used the tape will not protrude.

What is claimed is:

1. A disc cartridge for holding a disc-shaped recording medium having a recording portion on only one side thereof, comprising:

a case member having a base surface area larger than that of the recording medium and having provided therein an access window for a recording/playback device to access the recording medium; and a shutter for opening and closing the access window, wherein the case member is largely provided in the recording side of the recording medium, wherein the recording side of the recording medium is largely shielded from ambient conditions by the case member and the shutter, and the non-recording side of the recording medium is largely exposed to the ambient conditions, wherein the case member and the shutter each is provided with a flange arranged to overlie a portion of a major surface of the recording medium to prevent the recording medium from falling out of the disc cartridge.

2. A disc cartridge according to claim 1, wherein the case member is an integral unit molded in resin.

3. A disc cartridge according to claim 1, wherein the projection of the flange provided on the shutter onto the plane of the recording medium overlaps the recording medium when the shutter has closed the access window, and does not overlap the recording medium when the shutter has opened the access window.

* * * * *